United States Patent
Ori et al.

[15] 3,657,618
[45] Apr. 18, 1972

[54] WINDSHIELD WASHER AND WIPER

[72] Inventors: Takaaki Ori, Nagoya; Keitaro Kanada, Toyohashi-shi, both of Japan

[73] Assignee: Nippon Denso Kabushiki Kaisha, Kariya-shi, Japan

[22] Filed: July 31, 1969

[21] Appl. No.: 846,386

[30] Foreign Application Priority Data

| Aug. 6, 1968 | Japan | 43/67388 |
| Aug. 6, 1968 | Japan | 43/67389 |
| Sept. 28, 1968 | Japan | 43/84425 |
| Mar. 7, 1969 | Japan | 44/20902 |
| Mar. 10, 1969 | Japan | 44/18219 |

[52] U.S. Cl. ..................318/102, 318/471, 318/DIG. 2, 15/250.02, 15/250.12
[51] Int. Cl. .......................H02p 1/58, B60s 1/02
[58] Field of Search..............318/101, 102, 103, 104, 443, 318/471, 472, 473, 489; 15/250.02, 250.12, 250.16; 337/89

[56] References Cited
UNITED STATES PATENTS

| 2,907,850 | 10/1959 | Colombo | 337/89 X |
| 3,364,322 | 1/1968 | Siiberg | 337/89 X |
| 3,148,399 | 9/1964 | Ziegler | 15/250.12 X |
| 3,487,492 | 1/1970 | Bischoff | 318/443 X |

Primary Examiner—J. D. Miller
Assistant Examiner—Robert J. Hickey
Attorney—Cushman, Darby & Cushman

[57] ABSTRACT

A windshield washer and wiper system inducing a washer motor circuit and a wiper motor circuit both connected in parallel with a source of power. The system comprises a washer and wiper interlocking control circuit having a heating wire connected in parallel with a washer motor and a thermal switch provided with the wiper motor and adapted to be opened and closed by said heating wire. A switch means is also connected in series with the parallel circuit of said heating wire and said washer motor for controlling the starting and stopping of said washer and wiper interlocking device, and may incorporate a thermal switch utilizing a transition between a stress-deformed state and a self-returned state of a snap strip provided with a tension wire which expands or contracts with the application of heat.

6 Claims, 13 Drawing Figures

INVENTORS
TAKAAKI ORI
KEITARO KANADA

BY Cushman Darby & Cushman
ATTORNEYS

INVENTORS
TAKAAKI ORI
KEITARO KANADA

BY
Cushman, Darby & Cushman
ATTORNEYS

INVENTORS
TAKAAKI ORI
KEITARO KANADA

BY
Cushman, Darby & Cushman
ATTORNEYS

WINDSHIELD WASHER AND WIPER

BACKGROUND OF THE INVENTION

1. FIELD OF THE INVENTION

The present invention relates to a control system designed to interlock an electrically operated washer and wiper with each other.

2. DESCRIPTION OF THE PRIOR ART

Generally, when a washer is operated, it inevitably involves the actuation of a wiper. In the past, however, a wiper and a washer were operated independently so that considerable difficulties were involved in their operation. Such being the case, various interlocking devices for windshield washer and wiper have been proposed, although all of them have involved some problems preventing their successful adoption for practical use. For example, Japanese Utility Model Registration Publication Nos. 37744/1964 and 37745/1964 disclose typical devices known to the prior art. In one of these, a self-restoring type bimetal switch is inserted in series with a motor and a push on-off switch is used to operatively associate the washer motor with a wiper motor. In another, interlocked operations are realized by means of a manual-return type bimetal switch which is inserted in series with each of washer and wiper circuits and which provides differences in the timing of operations by means of its self-heating property. However, both of these prior art devices have disadvantages in that, since the operation of the washer and wiper start at the same time and there is some time lag between the start of the operation of the washer and the time when a liquid is sprayed onto the surface of the windshield, a wiper blade wipes the glass surface even in its initial dry interval thus causing serious damage to the surface of the windshield. Moreover, such bimetal switches are expensive because their manufacture involves very complicated procedures.

The better known prior art device of this kind has been disclosed in Japanese Patent Application Publication No. 27730/1964 wherein a washer driver circuit is controlled by an automatic return type bimetal switch which is interlocked with a push button and a wiper driver circuit is controlled by a bimetal relay adapted to automatically close an electric circuit when heated by a heating wire which is heated by the washer load current of the washer driver circuit. However, because the internal resistance of washers varies considerably from one to another, and in addition the rated operating currents of washers also differ substantially according to their manufacturers, such washer load currents likewise differ considerably, one from another. This means that the value of current which flows into said heating wire is not always equal and thus it is impossible to insure that the time interval between the energizing instant of the heating wire and the time when the bimetal relay is closed and a reverse time interval between the deenergizing instant of the heating wire and the time when the bimetal relay is opened meet exactly the desired values of the design objectives. Furthermore, an accurate reset time cannot be expected for said automatic reset type bimetal switch which is interlocked with the push button, since this bimetal switch is adapted to operate by the washer load current. In other words, as the operation of the circuit is controlled by the washer load current, it is difficult to insure that the device is satisfactorily adapted use with an automobile that may be equipped with a washer of any of several types so that the desired operation is obtained. There is another difficulty with these prior art systems. For instance, if the automatic reset type bimetal switch is interlocked with a push button, it is generally impossible to use the washer switch already supplied by the manufacturer, rather, a new one must be installed.

Still further, an inconvenience with the above described prior art devices occurs when a large quantity of detergent must be sprayed on the surface of the windshield of a vehicle after the surface has become very dirty. The reason for this is that such a self-resetting type of washer switch employs bimetal contacts and therefore its switching time will be rather limited unless a larger switch is employed. This means that the washer motor will stop before the desired amount of detergent can be sprayed. Moreover, if the washer switch is forcibly kept closed by means of the push button, there is another problem in that bimetal may be heated until its temperature rises to such an extent that plastic parts and similar components of the washer switch will be subjected to severe overheating damage. In short, the devices known to the prior art have a problem in that continued spraying of detergent is not possible, thus causing trouble when cleansing extremely dirty windshield surfaces.

SUMMARY OF THE INVENTION

It is therefore an object of the present invention to provide a washer and wiper interlocking device wherein a washer motor circuit and a wiper motor circuit are connected in parallel with a power source. A heating wire is connected in parallel with the washer motor and a thermal switch adapted to be opened and closed by said heating wire is provided with the wiper motor. A parallel circuit comprising said first heating wire and the washer motor is connected to the power source through a second heating wire and a washer switch, and a second thermal switch adapted to be opened and closed by the second heating wire is connected in parallel with a series circuit comprising the second heating circuit and the washer switch. The first thermal switch being adapted to close and open with a time delay with respect to the closing and opening of the second thermal switch, whereby said interlocking device may generally utilize the existing washer switch without any modification and at the same time may be well suited for use with an automobile having a washer of any type installed, thus providing the desired operating features to the maximum extent.

According to the present invention, both circuits of a washer motor and a wiper motor are connected in parallel with a power source, a first heating wire is connected in parallel with the washer motor and a first thermal switch adapted to be opened and closed by said first heating wire is provided with the wiper motor, a parallel circuit comprising the first heating wire and the washer motor is connected to one end of the power source through the second heating wire and a washer switch, a second thermal switch which is opened and closed by the second heating wire is connected in parallel with the second heating wire and the washer switch, and the first thermal switch is adapted to close and open with a time delay with respect to the closing and opening of the second thermal switch, whereby a wiper is actuated after a desired amount of rinsing liquid has been supplied and sprayed over the surface of the windshield to prevent any damage to the windshield due to dry wiping by the wiper means, and at the same time the continued operation of the wiper is ensured until the rinsing liquid has been completely wiped off. In addition to this superior result, the device according to the present invention has another superior result wherein, by making the ohmic values of the two heating wires considerably larger than that of the two heating wires considerably larger than that of the internal resistance of the washer motor (for example, the ohmic values of the two heating wires are made to be 50 ohms when the value of the internal resistance of the washer motor is 5 ohms), the device may operate entirely as a voltage element and will not operate entirely as a voltage element and will not operate on the washer load current even if the internal resistance of individual washers may differ slightly from one another. Thus, the device is well suited for use on an automobile which may have installed any type of washers, and at the same time it is capable of exhibiting its characteristic features to the maximum possible extent. Further, greater effectiveness is achieved wherein a so-called single touch operation is realized because a current that flows through the washer switch connected in series with the second heating wire is very low and thus a lower contact pressure is available for the switch, and moreover any conventional push-button type switches which are already installed may be utilized without any changes. Still further, although the continued closing of the washer switch results in the continued energization of the wiper motor, the washer motor operates intermittently and there is no need to intermittently operate the washer switch as will be required when the front window is very dirty, thus greatly contributing towards safe driving.

Another object of the present invention is to provide a washer and wiper interlocking device for vehicles wherein a washer switch is additionally provided with a second switch connected to one end of a power source, whereby both washer and wiper automatically operate during a certain period of time upon a single touch operation of the washer switch, while the wiper motor is adapted to start and stop with a certain time delay with respect to the washer motor, and moreover the second switch of the washer switch may be closed to thereby cause the washer and wiper to operate under excellent conditions for a long period of time.

According to the present invention, still further effects are provided wherein a mere single touch operation of the washer switch interlocks and automatically puts the washer and the wiper into operation, and at the same time the wiper motor is permitted to start and stop with a certain time delay with respect to the washer motor, and wherein the second switch of the washer switch may be kept closed to permit the spraying of a large quantity of rinsing liquid onto the surface of the windshield, thus affording greater inconvenience when the glass surface is extremely dirty.

A further object of the present invention is to provide a washer and wiper interlocking device which incorporates a mechanism, more particularly an automatic stop mechanism by which the activation of a washer automatically operates a wiper in interlocked relation with the washer, whereby a positive and yet simplified means of interlocking the wiper and the washer is provided.

The device according to the present invention is particularly useful in that the aforementioned improvements are realized with the addition of only a few thermally operated means or further relay means and there is no need to modify the construction and electric circuit of the widely used washers and the usual wipers provided with an automatic stop mechanism for stopping at a fixed position.

Furthermore, in order to eliminate the drawbacks of the prior art devices, a still further object of the present invention is to provide an interlocking device of a washer and a wiper which is inexpensive but which operates well, wherein a tension wire which expands or contracts, according to the application or removal of heat is secured, when cold, to a snap strip at the supporting points thereon such that the snap strip remains subjected to stress deformation, said snap strip being provided with a movable contact, said tension wire being connected to a washer motor connected in series with a washer switch, and wherein a fixed contact is inserted in a wiper motor circuit so that said fixed contact is electrically connected to said movable contact when the tension wire expands by its self-heating effect due to the washer load current and said snap strip recovers to its free state after deformation, whereby thermal switches which are easy to manufacture may be employed so that the wiper is actuated at a specific time after the washer switch is closed.

According to the present invention, the wiper is adapted to operate at a certain time after the washer switch is closed and the wiper stops operating at a certain time after the washer is opened so that the wiper blade will not be permitted to wipe the glass surface without rinsing liquid causing damage to the glass and the rinsing liquid will be prevented from remaining on the glass surface. On the other hand, since the snap strip may be easily pressed from a steel strip and the tension wire as well as a lead ribber are quite readily available in the form of nichrome, copper, aluminum and other similar materials and their manufacture is simple, it is possible to provide an inexpensive device. Further, while the operating speed of contacts is inherently low in conventional devices utilizing bimetals, a faster closing and opening speed is attained with the device of the present invention, since the contacts are opened and closed by the snapping action of the snap strip and therefore there is no possibility of contact wear due to sparking and the like. At the same time, the tension of the tension wire is easily changeable and therefore it is possible, for example, to readily adjust differences in the time delay in the snapping operation of the snap strip due to differences in the values of the washer load current in individual devices. These are among the remarkable results attributable to the present invention.

DESCRIPTION OF THE PREFERRED EMBODIMENTS

Figure 1:
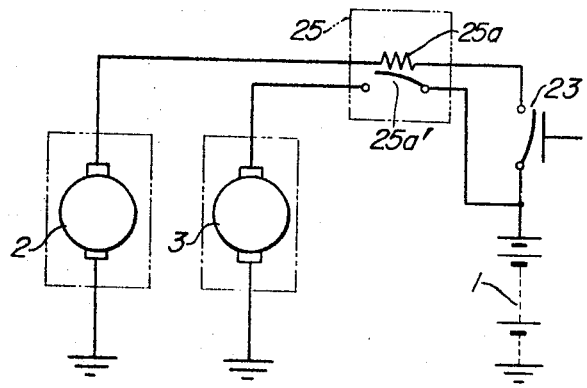
FIG. 1 is a wiring diagram showing a device known to the prior art.

The device of Japanese Patent Publication No. 27730/1964 already discussed by way of an example of the conventional devices of this kind will be explained with reference to FIG. 1. In operation, a washer switch 23 is such that its bimetal contacts are operated by a push-button and therefore if the switch is closed, the bimetal contacts return to their open position by virtue of the self-heating effect. Thus, by closing the washer switch 23 through a single touch operation a current flows continuously through the washer motor 2 for a certain period of time and this operates the motor 2. At the instant when the motor 2 is started, a current also flows into a heating wire 25a of a thermal switch 25 and a switch 25' is closed by the heating effect of the heating wire 25a at a certain time after the starting of the washer motor 2. When this happens, the motor 3 is operated. In other words, initially the washer motor 2 is operated to spray rinsing liquid on the surface of the vehicle window and then the wiper 3 operates to wipe off the glass surface. In this way, the surface of the windshield is protected against any damage due to dry wiping by the wiper. After some time the bimetal contacts of the washer switch 23 return to their open position and the washer motor stops to, in turn, cause the spraying of liquid to stop. However, switch 25a' of the thermal switch 25 does not open immediately and it continues to be gradually cooled until it opens after a certain time lapse. This means that the wiper 3 continues to operate for a period of time after the washer motor 2 stops operating and thus the rinsing liquid on the window surface may be completely wiped off. However, because the above described prior art device utilizes a self-releasing type bimetal switch for controlling the associated operations of the washer and wiper, there are drawbacks: (1) such self-restoring type bimetal switch lacks adaptability (or adjustability) with respect to washers having differently rated operated currents and manufacturing dispersion in the internal resistance of washers having the same rating; (2) due to the construction which is interlocked with the push-button, the use of an already installed washer switch is not possible; and (3) there is inconvenience when a large quantity of rinsing liquid must be sprayed continuously. The device according to the present invention which eliminates the aforesaid drawbacks, is highly adaptable, interchangeable and inexpensive, and moreover affords various superior functions and effects not experienced with the conventional devices, which will be explained in conjunction with the embodiments shown in FIGS. 2 et seq.

Figure 2:
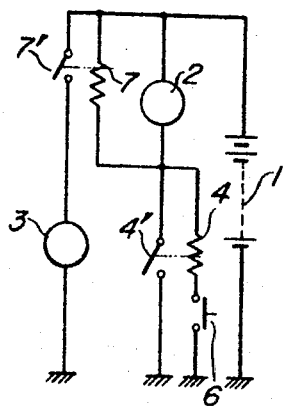
FIG. 2 is a wiring diagram showing a first embodiment of the washer and wiper interlocking device according to the present device.

Referring to FIG. 2, numeral 1 designates a source of power such as a battery; 2 a washer motor; 3 a wiper motor; 4 a heating wire connected in series with a washer switch 6, one end of the heating wire being connected to the washer motor 2. Numeral 4' designates a normally open thermal switch which closes upon application of heat by the heating wire 4, the switch being connected in parallel with a series circuit of the heating wire 4 and the washer switch 6. Numeral 7 designates a heating wire connected in parallel with the washer motor 2. Numeral 7' designates a normally open thermal switch adapted to close when heated by the heating wire 7 and connected in series with the wiper motor 3. The ohmic values of the heating wires 4 and 7 are predetermined so that the thermal switch 7' closes and opens with a certain time delay with respect to the closing and opening of the thermal switch 4'. In this connection, such time delay may be introduced if the normally open contact pressures are suitably selected.

Figure 3:
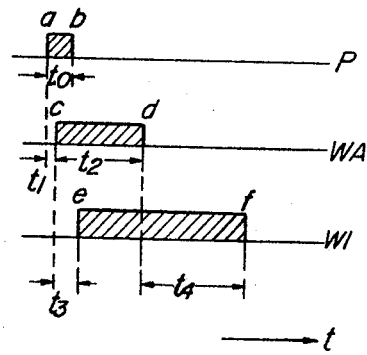
FIG. 3 is a graphical view of the operation of the device of the first embodiment.

With the construction described above, the device according to the present invention operates as will be explained hereinafter. Upon closing the washer switch 6, a circuit is established comprising the power source 1, the parallel circuit of the washer motor 2 and the heating wire 7, the heating wire 4, the washer switch 6 and the earth. The current that at this time flows through the washer motor 2 is preset to a value lower than the rated current by properly selecting the ohmic values of the heating wires 4 and 7 so that the washer motor 2 is not operated. Thus, initially the thermal switch 4' is closed as it is heated by the heating wire 4. When this happens, the washer motor 2 is directly grounded and commences to function. Then, the thermal switch 7' when heated by the heating wire 7 closes at a certain time after the closing of the thermal switch 4', whereupon the wiper motor 3 also operates. On the contrary, if the washer switch 6 is opened, the heating wire 4 cools down to open the thermal switch 4' and thus the washer motor 2 stops. Then, as the heating wire 7 cools down, the thermal switch 7' also opens with a predetermined time delay to stop the wiper motor 3. FIG. 3 represents the aforesaid operations of the device of the present invention in terms of the operation time.

In FIG. 3, P indicates the operation of the washer switch 6; WA the operation of the washer; WI the operation of the wiper; and the horizontal axis represents the values of the time lapse $t$. Now although the washer switch 6 is closed at the time $a$, this does not cause the washer motor 2 to operate immediately as the heating wire 4 is being heated up. Thus, the washer WA starts operating at the time $c$ delayed for a time duration $t_1$ after the heating wire 4 is sufficiently heated and the thermal switch 4' is consequently closed. At the time which is still later than the time $c$ by a time duration $t_3$, the thermal switch 7' closes to cause the wiper WI to operate. In this case, if the washer switch 6 remains closed during a time duration $t_0$ and opens at the time $b$, the thermal switch 4' will remain closed for some time by virtue of its own heat capacity and at the time $d$ which is delayed by a time duration $t_2$ after the time $c$, the switch 4' will open to cause the washer WI to stop. The wiper WI will stop at the time $f$ which is later than the time $d$ by a time $t_4$. Now assume that the washer switch 6 is kept closed, at the instant the thermal switch 4' is closed by the heat of the heating wire 4 a current flows through the thermal switch 4' to the ground so that there is no flow of current through the heating wire 4 any longer and the wire 4 cools down. As a result the thermal switch 4' gradually cools until it opens. When this happens, the heating wire 4 is again energized through the washer motor 2. Thus it will be seen that the continued closing of the washing switch 6 will result in the repetition of the same cycle of operations. In other words, the heating wire 4 starts to cool down as early as at the time $c$ in FIG. 3 at which point the washer motor starts to cool down as early as at the time $c$ in FIG. 3 at which point the washer motor 2 would have started operating. Therefore, the operating time duration $t_2$ of the washer WA in FIG. 3 remains the same, regardless that the time during which the washer switch 6 is kept closed is somewhat longer or shorter. Further, the washer WA intermittently operates with a cycle in which having operated for the time duration $t_2$ the washer WA stops operating upon opening of the thermal switch 4, the heating wire 4 is reheated to reclose the thermal switch 4' (this time is predetermined by the operating heat capacity of the thermal switch 4'), and the washer WA again operates during the time duration $t_2$. However, it must be remembered that the wiper WI is so designed that the thermal switch 7' will remain closed during a time duration $t_4$ after the washer WA stops and it will not immediately, whereas if the washer switch 6 is kept closed the wiper WI will continue operating without interruption, even though the washer WA will continue its on-and-off cycle of operations. Where the surface of the front window is found to be extremely dirty during driving, it will be necessary to supply a large quantity of washing water. In the past, a washer switch was kept closed in such case, as the continued supply of the washing water would deteriorate the field of vision in front and it would be necessary to switch the washer off and on occasionally for proper observation. With the device according to the present invention, however, these operations may be effected automatically. The washer switch 6 may be of a push-button type switch which is installed in ordinary vehicles. Furthermore, since the resistance of the heating wire 4 is inserted in series with the parallel circuit of the washer motor 2 and the heating wire 7, the current that flows into the washer switch 6 is kept low so that any inexpensive contacts may be used with the switch 6 and a reduced contact pressure will be also possible. These factors make it possible for the wiper and washer to perform a sequence of operations as shown in FIG. 3 through a single-touch operation.

Figure 4:
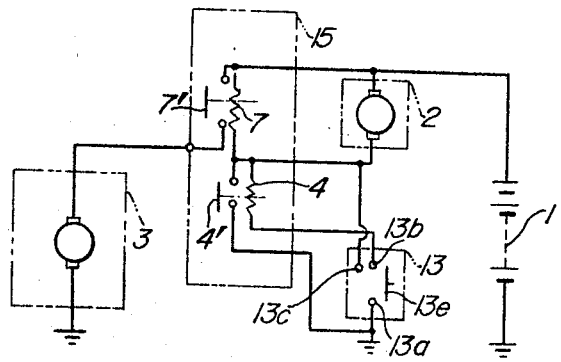
FIG. 4 is a wiring diagram showing a second embodiment of the present invention.
Figure 5:
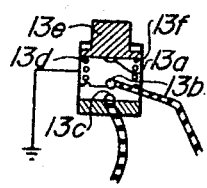
FIG. 5 is a longitudinal sectional view showing the construction of the washer switch in the device of the second embodiment.

In the description to follow, differences between the second embodiment shown in FIG. 4 and the first embodiment of FIG. 2 will be explained. In FIG. 4, numeral 15 designates a thermal switch for interlocking a wiper and a washer and adapted to close and open two circuits. Numerals 7' and 4' designate switches and 7 and 4 designate heating wires. FIG. 5 shows a detailed construction of a washer switch 13 in which numerals 13a, 13b and 13c are contacts; 13d a return spring; 13e a metallic push-button; 13f a metallic switch casing, the contact 13a being grounded through the push-button 13e and the switch casing 13f. The contacts 13a and 13b constitute a first switch in the washer switch 13 shown in the circuitry of FIG. 4 and the contacts 13a and 13c provide a second switch.

In operation under normal condition when the surface of the vehicle window is not so dirty, the push-button 13e of the washer switch 13 is lightly depressed to bring the contacts 13a and 13b into contact. This provides the interlocked operations of a washer and a wiper in the same manner as the first embodiment shown in FIG. 2. When the degree of dirtiness of the windshield surface becomes serious, the push-button 13e of the washer switch 13 is further depressed and the contacts 13a and 13b are contacted, whereupon all the contacts 13a, 13b and 13c are brought into contact and in FIG. 4 the contacts 13b and 13c are all grounded through the contact 13a. Therefore, the circuit of the heating wire 4 and the switch 4' in the thermal switch 4 is shorted upon closing of the contacts 13a and 13c and so a current flows through the parallel circuit of the heating wire 7 and the washer motor 2 independent of the switch 4. This condition is maintained as long as the push-button 13e of the washer switch 13 is kept depressed and the washer motor 2 rotates continuously, thereby making it possible to spray a large quantity of rinsing liquid on the glass surface.

Figure 6:
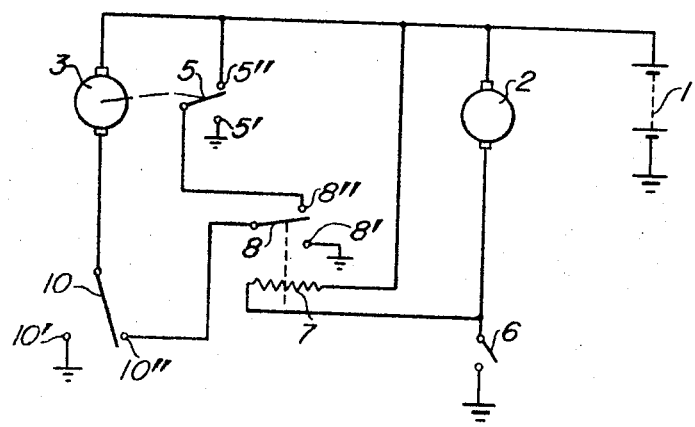
FIG. 6 is a wiring diagram showing a third embodiment of the present invention.
Figure 8:
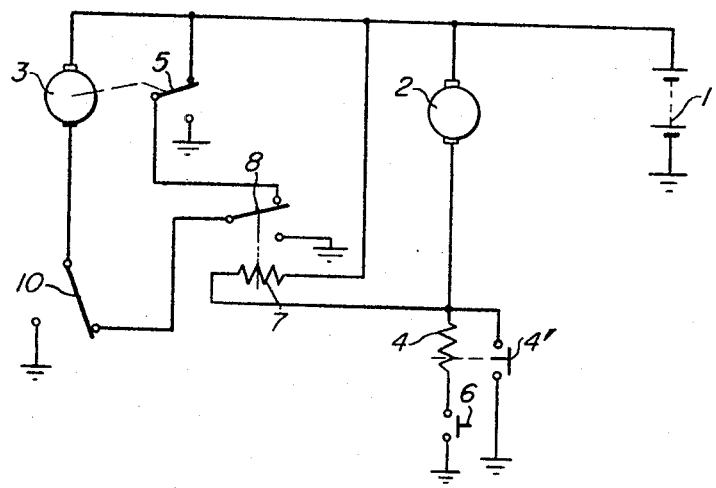
FIG. 8 is a wiring diagram showing a fourth embodiment of the present invention.

Referring to FIGS. 6 and 8, the third and the fourth embodiment respectively illustrated therein will be explained. In FIG. 1, numeral 1 designates a power source; 3 a wiper motor connected between the power source 1 and a manually operated wiper switch 10. Numeral 5 designates an automatic stop switch which is universely used to provide a so-called automatic fixed point stop. This switch operates in interlocked relation with a wiper so that the switch and the contact 5' are closed to connect the wiper motor 3 to the power source 1 while a wiper blade (not shown) has not come to its stop position and at the instant the wiper blade comes to its stop position the switch and a contact 5'' are closed to short both ends of the armature of the wiper motor 3 to apply dynamic braking. Numeral 2 designates a washer motor connected between the power source 1 and a manually operated washer switch 6 which is connected at one end thereof to the other terminal of the power source 1. Numeral 7 designates a heating wire for a wiper and washer interlocking device connected between the power source 1 and the washer switch 6 in parallel with the washer motor 2. Numeral 8 designates a thermal switch which utilizes the thermal expansion of materials such as metals so that when heated by the heating wire 7 it is connected to a contact 8' and when the heating stops and it cools down it is normally connected to a contact 8''. The switch 8 is connected to a contact 10'' of the wiper switch 10, the contact 8' to the power source 1 and the contact 8'' to the automatic wiper stop switch, respectively. The other contact 10' of the wiper switch 10 is connected to the power source 1. In operation, in order that the wiper is operated alone, the wiper switch 10 is connected to the contact 10'. This completes the circuit through the wiper motor 3 and the wiper operates. To stop the wiper, the wiper switch 10 is merely switched to the contact 10''. The series of operations for stopping the wiper under these conditions will be explained hereinafter. In this case, the washer switch 6 is open, no current is flowing through the heating wire 7, and the thermal switch 8 is not heated by the heating wire 7 as it generates no heat so that the switch 8 is connected to the contact 8''. Therefore, the contact 10'' is connected to the automatic stop switch 5 through the switch 8 and the contact 8''. As a result, the automatic stop switch 5 remains connected to the contact 5' until the wiper blade is brought to the stop position. Thus, a circuit is established through the power source 1, wiper motor 3, wiper switch 10, contact 10''', thermal switch 8, contact 8''', automatic stop switch 5 and the contact 5', and the wiper motor 3 continues to rotate. The instant the wiper blade comes to the stop position, the stop switch 5 is thrown onto the contact 5'' so that the wiper motor 3 is disconnected from the power source 1 and moreover a closed circuit is established between the armature terminals to apply dynamic braking. In this way, the wiper is forced to stop by the arrival of the wiper blade at the stop position.

In order to put the washer into operation, the washer switch 6 is closed so that the washer motor 2 operates, whereupon rinsing liquid is sprayed on the windshield surface. At the same time, a current flows through the heating wire 7 and the thermal switch 8 is heated by the application of heat from the heating wire 7. In this case, if the heat capacity and contact separation of the thermal switch 8 as well as the value of current that flows through the heating wire 7 and other factors are adjusted to delay to some extent the time at which the thermal switch 8 is thrown onto the contact 8', the wiper may be caused to operate after the required supply of rinsing liquid has been sprayed on the window surface, thus avoiding damage to the windshield. When the thermal switch 8 and the contact 8' are closed, a circuit is completed through the power source 1, wiper motor 3, wiper switch 10, contact 10'', thermal switch 8 and the contact 8', and now the wiper operates in an interlocked relation with the washer. To stop the washer, the washer switch 6 is opened. This brings the washer motor 2 to rest so that the supply of rinsing liquid stops immediately, while on the other hand no current is supplied to the heating wire 7 and it no longer generates heat. However, because of the heat capacity of the thermal switch 8, until the switch 8 itself cools down the switch 8 and the contact 8' remain closed, causing the wiper to continue its operation until the rinsing liquid is completely wiped off. When the thermal switch 8 is has cooled again and moves onto the contact 8'', the wiper motor 3 is connected to the automatic stop switch 5 through the wiper switch 10, contact 10'', thermal switch 8 and the contact 8''. However, the switch 5 and the contact 5' remain closed unless the wiper blade is brought to the stop position causing the wiper to continue operating. At the instant the wiper blade comes to the stop position, the automatic stop switch 5 is thrown into the contact 5'', whereupon a closed circuit is established between the ends of the wiper motor 3 to apply dynamic braking thereto in the same manner as when the wiper is operated independently, thereby forcing the wiper to stop at the fixed point.

Figure 7:
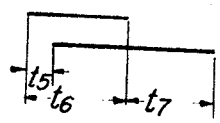
FIG. 7 is a graphical view for explaining the operation of the wiper and washer in the third embodiment.

FIG. 8 shows a further embodiment of the device of the present invention wherein, in addition to the circuit of FIG. 6, a heating wire 4 is connected in series with the washer switch 6 and a thermal switch 4' is connected in parallel with a series circuit comprising the heating wire 4 and the washer switch 6, the switch 4' being adapted to close its contacts when heated by the heating wire 4 and open the contacts under normal cold condition. In this embodiment, closing of the washer switch 6 causes the washer to continue its operation for a predetermined time, even if the switch 6 were opened after its closing and there is no need for the switch 6 to be kept closed all the time the washer is operating, and the wiper also operates in the same interlocked manner as with the circuitry of FIG. 6. In other words, when the washer switch is closed, a current flows through the heating wire 4 which in turn generates heat to apply it to the thermal switch 4, whereupon the switch 4' closes. This operates the washer and the wiper operates in the same interlocked fashion as is the case with FIG. 6. With the washer switch 6 open, no current flows through the heating wire 4, and the heating wire 4 generates no heat. However, by virtue of the heat capacity of the thermal switch 4', the switch 4' is kept closed until it itself cools down and so current is supplied to the washer motor 2 and the heating wire 7 through the switch 4' to maintain the operation. After the lapse of a suitable length of time the thermal switch 4' cools down and opens, whereupon the wiper is automatically stopped at the fixed point at a time after the washer is stopped in the same fashion as in the circuit of FIG. 6. That is, in both embodiments of FIGS. 6 and 8, as shown in FIG. 7, the wiper is operated after a time duration $t_5$ from the actuation of the washer and, after the operation of the washer having continued for a time duration $t_6$, wiper operation continues for a time duration $t_7$ and then the wiper stops automatically at the fixed time. In this connection, in the embodiment of FIG. 6, the manual pressing of the washer switch 6 must be continued during the time duration $t_6$, while in the embodiment of FIG. 8 a momentarily depression of the washer switch 6 by hand enables the washer to automatically operate during the time $t_6$.

Figure 9:
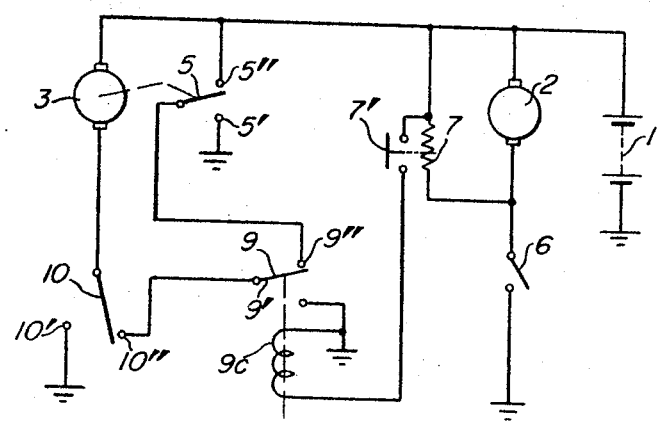
FIG. 9 is a wiring diagram showing a fifth embodiment of the present invention.
Figure 10:
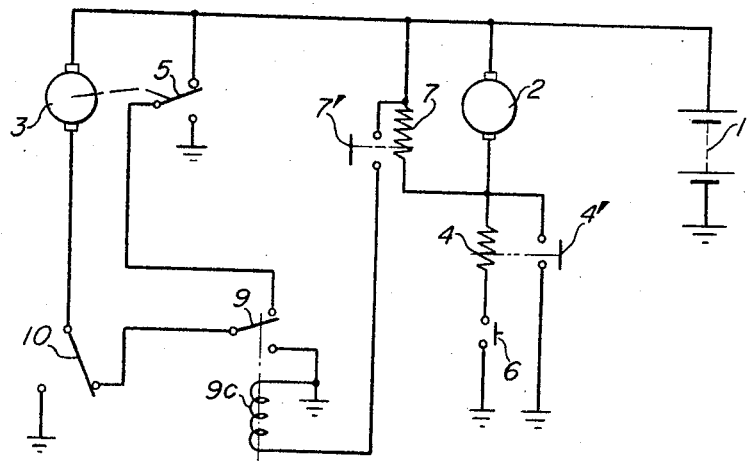
FIG. 10 is a wiring diagram showing a sixth embodiment of the present invention.

The fifth and sixth embodiments shown in FIGS. 9 and 10, respectively, differ from those of FIGS. 6 and 8 in that a relay coil 9c and a relay 9 are employed in place of the thermal switch 8. In other words, the other end of the thermal switch 7' adapted to be actuated by the application of heat from the heating wire 7 is connected to a relay coil 9c of a relay which operates the wiper in an interlocked relationship with the washer, and the other end of the relay coil 9c is connected to the other terminal of the power source 1. Numeral 9 designates a relay switch which, when current flows through the relay coil 9c, it is caused to engage a contact 9' by the attractive force of the coil 9c. When no current flows through the relay coil 9c, the relay 9 engages a contact 9'' and this relay is also connected to the contact 10'' of the wiper switch 10. The contact 9' is connected to the terminal of the power source 1 which forms an operating circuit for the wiper motor 2, and the contact 9" is connected to the automatic wiper stop switch 5. The remaining connections and operations are the same with those of the embodiments shown in FIGS. 6 and 8 and therefore they will not be explained.

Figure 11:
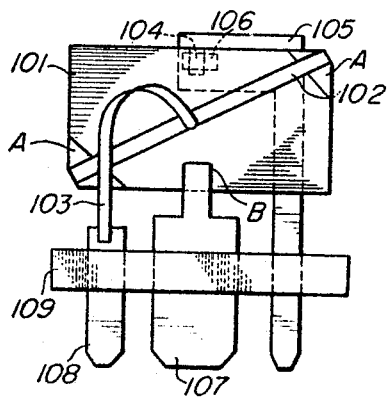
FIG. 11 is a front view showing an embodiment of the thermal switch which forms a main constituent element of the washer and wiper interlocking device according to the present invention.

Before proceeding with the description of the seventh embodiment of the present invention with reference to FIG. 12, the thermal switch used in the device of the present invention will be explained in conjunction with FIG. 11. In the figure, numeral 101 designates a snap strip which is formed of conducting metals such as a strip steel and performs a snapping action. Numeral 102 designates a tension wire made of a ribbon of conducting thermally expansive metals such as nichrome, the wire being secured by means of welding, soldering, brazing etc., to both corners A on one side of the strip 101 so that it expands when its temperature is raised considerably by a current flowing through the strip 101. Numeral 103 designates a lead ribbon made of very thin and soft conducting metals such as copper and aluminum, the lead ribbon being secured to the central portion of the tension wire 102 by means of welding, soldering, brazing, or wrapping, etc., and the other end of the lead ribbon being similarly secured by such means to an electrical terminal plate 108 molded in a base plate 109 which is formed of plastic materials such as phenol resin and the like. The lead ribbon 103 is a very thin and soft metal piece and therefore it will in no way prevent the movement of the strip 101 and the tension wire 102, although the tension wire 102 moves as the snap ring 101 makes a movement. Because the snap strip 101 is secured to an electrical terminal 107 molded in the base plate 109 at a point B which deviates laterally from a broken line determined by the linear deformation of the strip 101, the movable portion of the strip 101 moves with a relatively large amplitude when the strip is snapped reciprocately between its free restored position and stress-deformed position by the tension wire 102. An electrical contact 104 is secured by means of welding, soldering, brazing, etc., to the central portion on the side of the snap strip opposite to the side on which the tension wire 102 is secured. Therefore it will be apparent that the contact 104 makes a snapping motion of large amplitude as a movable contact when the snap strip 101 is deformed as a result of its snapping motion caused by the tension wire 102. A fixed contact 106 is disposed in opposition to the movable contact 104 and within the amplitude of the restored and deformed positions of the snap strip 101 and this fixed contact 106 is secured by means of welding, soldering, brazing etc., to the electrical terminal 105 molded in the base plate 109.

Figure 12:
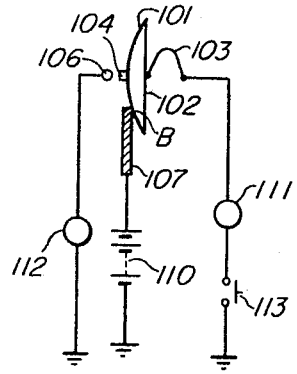
FIG. 12 is a wiring diagram showing a seventh embodiment of the present invention.

Now referring to FIG. 12 showing a circuit diagram of the seventh embodiment, numeral 110 designates a battery whose negative terminal is grounded and positive terminal is connected to the electric terminal 107. Numeral 111 designates a washer motor connected at one end thereof to the lead ribbon 103 and at the other end to a washer switch 113, the other end of the washer switch 113 being grounded. Numeral 112 designates a wiper motor whose one end is grounded and the other end is connected to the fixed contact 106.

With the arrangement described above, the operation of the illustrated device will be explained. In FIG. 12, when the washer switch 113 is closed, a circuit is completed through the battery 110, electrical terminal 107, snap strip 101, tension wire 102, lead ribbon 103, washer motor 111, washer switch 113 and the earth, whereupon the washer motor 111 operates and the tension wire 102 heats itself with the washer load current to gradually expand and extend so that after a preset time the snap strip 110 is restored from the stress-deformed state to the free state. As a result, the movable contact 104 mounted on the snap strip 101 engages the fixed contact 106 to establish a circuit through the battery 110, electrical terminal 107, snap strip 101, contact 104, contact 106, wiper motor 112 and the earth, and thus the wiper motor 112 is operated at a predetermined time after closure of the washer switch 113. On the other hand, if the washer switch 113 is opened, the washer motor 111 stops immediately. However, by virtue of its heat capacity the tension wire 102 contracts gradually until, after a predetermined time, the tensile force due to its contraction overcomes the restoring force of the snap strip 101 to its free state forcing the strip 101 into a stress-deformed state in a snapping manner. When this happens, the movable contact 104 disengages the fixed contact 106 and the supply of current to the wiper motor 112 stops so that the wiper motors 110 stops at a predetermined time after the washer switch is opened.

Figure 13:
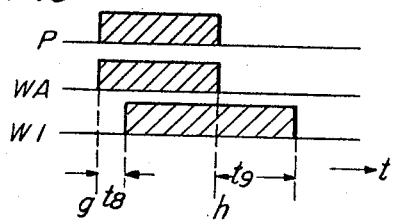
FIG. 13 is a graphic view for explaining the operation of the seventh embodiment.

FIG. 13 represents the above described operations in the form of a time chart. In this figure, P designates the operation of the washer switch 113; WA the operation of the washer; WI the operation of the wiper. The horizontal axis represents the time lapse $t$. In other words, the instant the washer switch 113 is closed at the time $g$ the washer is also operated. However, the wiper will not operate at this time $g$, but will only do so after the lapse of a time duration $t_8$. This time duration $t_8$ is the period during which the tension wire 102 is gradually heated and expands until the restoring force of the snap strip 101 overcomes the tensile force of the tension wire 102 and the strip 101 returns to its free state thereby closing the movable contact 104 and the fixed contact 106. Then, if the washer switch 113 is opened at time $h$, the washer also stops simultaneously, but the wiper will stop after the lapse of a time duration $t_9$. This time duration $t_9$ is the period between the time that the tension wire 102 gradually cools down and contracts until the tensile force of the tension wire 102 overcomes the restoring force of the snap strip 101 to its free state thereby deforming the snap strip 101 into its stress-deformed state and the time that the movable contact 104 disengages the fixed contact 106. The time durations $t_8$ and $t_9$ may be changed freely by suitably adjusting the tensile force of the tension wire 102, and the modification of tensile force of the tension wire 102 may be readily effected by suitably bending the corners of the snap strip 101.

We claim:

1. A windshield wiper and washer system comprising:
   a wiper motor and a washer motor,
   a thermal device comprising a heater wire and a normally open thermal switch which is closed by the heating of said heater wire,
   said heater wire and said washer motor being connected in parallel and adapted for electrical connection to one terminal of a power source,
   said wiper motor and said normally open thermal switch being connected in series and also adapted for electrical connection to one terminal of the power source,
   a second thermal device comprising a second heater wire and a second normally open thermal switch which is closed by the heating of said second heater wire, and
   a manually operated washer switch,
   said second heater wire and said washer switch being connected in series with said washer motor,
   said second thermal switch being connected in parallel with said second heater wire and said washer switch.

2. A windshield wiper and washer system comprising:
   a wiper motor and a washer motor,
   a thermal device comprising a heater wire and a normally open thermal switch which is closed by the heating of said heater wire,
   said heater wire and said washer motor being connected in parallel and adapted for electrical connection to one terminal of a power source,
   said wiper motor and said normally open thermal switch being connected in series and also adapted for electrical connection to one terminal of the power source,
   a second thermal device comprising a second heater wire and a second normally open thermal switch which is closed by the heating of said second heater wire, and
   a washer switch comprising a first normally open manual switch and a second manual switch which is closable when said first manual switch is at its closing state, said second heater wire and said first manual switch being connected in series with said washer motor, said second thermal switch and said second manual switch being connected in parallel to a series circuit of said second heater wire and said first manual switch.

3. A windshield wiper and washer system comprising:

a wiper motor and a washer motor, a thermal device comprising a heater wire and a normally open thermal switch which is closed by the heating of said heater wire, said heater wire and said washer motor being connected in parallel and adapted for electrical connection to one terminal of a power source, said wiper motor and said normally open thermal switch being connected in series and also adapted for electrical connection to one terminal of the power source, a manually operated washer switch, a manually operated wiper switch comprising a first manual wiper switch contact and a second manual wiper switch contact which are alternatively closable, and a wiper blade limiting switch comprising first and second limiting switch contacts which are respectively closed and opened when the wiper blade is located at a predetermined stop position, said first mentioned thermal device being further provided with a normally closed thermal switch contact which is opened by the heating of said first-mentioned heater wire, said washer switch being connected to said washer motor and adapted for connection to one terminal of the power source, said first-mentioned normally open thermal switch being connected to said wiper motor and adapted for connection to one terminal of said power source through said second manual wiper switch contact, said first manual wiper switch being connected to said wiper motor and adapted for connection to one terminal of said power source, and said normally closed thermal switch contact being connected in parallel to said first-mentioned normally open thermal switch through said second limiting switch contact and also being connected in parallel to the series circuit of said wiper motor and said second manual wiper switch contact through said first limiting switch contact.

4. A windshield wiper and washer system as in claim 3 further comprising:

a second thermal device comprising a second heater wire and a second normally open thermal switch which is closed by the heating of said second heater wire, said second heater wire and said washer switch being connected in series to said washer motor and adapted for connection to one terminal of said power source, said second thermal switch being connected in parallel to the series circuit of said second heater wire and said washer switch.

5. A windshield wiper and washer system as in claim 4, wherein:

said first-mentioned thermal device is provided with a relay coil which is energized by the heating of said first-mentioned heater wire, said first-mentioned thermal switch and said normally closed thermal switch contact being actuated by the energizing of said relay coil.

6. A windshield wiper and washer system as in claim 3, wherein:

said first-mentioned thermal device is provided with a relay coil which is energized by the heating of said first-mentioned heater wire, said first-mentioned thermal switch and normally closed thermal switch contact being actuated by the energizing of said relay coil.

* * * * *